United States Patent
Negishi et al.

(10) Patent No.: US 12,456,398 B2
(45) Date of Patent: Oct. 28, 2025

(54) CONTROL METHOD FOR VISIBILITY INFORMATION ACQUISITION DEVICE AND VISIBILITY INFORMATION ACQUISITION DEVICE

(71) Applicants: SUZUKI MOTOR CORPORATION, Hamamatsu (JP); National University Corporation Yokohama National University, Yokohama (JP)

(72) Inventors: Daisuke Negishi, Hamamatsu (JP); Hidenori Horita, Hamamatsu (JP); Katsunori Okajima, Yokohama (JP); Shumpei Onuki, Yokohama (JP)

(73) Assignees: SUZUKI MOTOR CORPORATION, Hamamatsu (JP); NATIONAL UNIVERSITY CORPORATION YOKOHAMA NATIONAL UNIVERSITY, Yokohama (JP)

( * ) Notice: Subject to any disclaimer, the term of this patent is extended or adjusted under 35 U.S.C. 154(b) by 0 days.

(21) Appl. No.: 18/695,238

(22) PCT Filed: Mar. 22, 2022

(86) PCT No.: PCT/JP2022/012970
§ 371 (c)(1),
(2) Date: Mar. 25, 2024

(87) PCT Pub. No.: WO2023/053517
PCT Pub. Date: Apr. 6, 2023

(65) Prior Publication Data
US 2024/0274043 A1  Aug. 15, 2024

(30) Foreign Application Priority Data
Sep. 30, 2021 (JP) ................. 2021-161259

(51) Int. Cl.
*G09G 3/00* (2006.01)
*G06F 3/01* (2006.01)

(52) U.S. Cl.
CPC ............ *G09G 3/001* (2013.01); *G06F 3/011* (2013.01); *G09G 2320/0257* (2013.01); *G09G 2354/00* (2013.01)

(58) Field of Classification Search
CPC .. G06F 3/011; G06F 3/04812; G06F 3/04815; G06F 3/04842; G06F 3/1423;
(Continued)

(56) References Cited

U.S. PATENT DOCUMENTS

| 9,766,697 | B2 | 9/2017 | Inomata |
| 10,409,365 | B2 | 9/2019 | Inomata |
(Continued)

FOREIGN PATENT DOCUMENTS

| CN | 112806952 A | 5/2021 |
| JP | H04-5948 A | 1/1992 |
(Continued)

OTHER PUBLICATIONS

International Search Report dated Jun. 7, 2022 issued in International Application No. PCT/JP2022/012970.
(Continued)

*Primary Examiner* — Nelson M Rosario
(74) *Attorney, Agent, or Firm* — TROUTMAN PEPPER LOCKE LLP

(57) ABSTRACT

In a visibility information acquisition device, a display control unit displays a first identifier at a first position ahead of a subject and subsequently displays a second identifier at a second position spaced in the front-back direction from the first position, and moves the viewpoint of the subject from the first position to the second position. The display control unit then controls the display state of the second identifier (Continued)

according to the transition condition, and causes the visibility of the second identifier to transition from a reference state to an intended state different from the reference state. The visibility information on the second identifier during transition is acquired by an information acquisition unit. Accordingly, information required to allow generation of a virtual space image that achieves visibility close to that of the appearance of a real space can be acquired at high accuracy when the viewpoint is moved.

11 Claims, 8 Drawing Sheets

(58) Field of Classification Search
CPC ........... G06F 2203/04801; G06T 15/20; G06T 19/00; G06T 19/003; G09G 3/001; G09G 5/00; G09G 5/38; G09G 2320/0257; G09G 2340/04; G09G 2354/00

See application file for complete search history.

(56) References Cited

U.S. PATENT DOCUMENTS

| | | | |
|---|---|---|---|
| 2017/0364146 A1* | 12/2017 | Inomata | G06F 3/012 |
| 2018/0081519 A1* | 3/2018 | Kim | G06F 3/011 |
| 2020/0311881 A1 | 10/2020 | Lanman et al. | |
| 2020/0326543 A1* | 10/2020 | Kim | G06F 3/011 |

FOREIGN PATENT DOCUMENTS

| | | |
|---|---|---|
| JP | 2000-245697 A | 9/2000 |
| JP | 2014-130204 A | 7/2014 |
| JP | 2017-059196 A | 3/2017 |
| JP | 2017-138701 A | 8/2017 |
| JP | 2021-514716 A | 6/2021 |
| KR | 10-2019-0141617 A | 12/2019 |

OTHER PUBLICATIONS

Office Action issued in counterpart Korean Patent Application No. 10-2024-7007968 dated Aug. 21, 2025 (including machine translation).

* cited by examiner

CONTROL METHOD FOR VISIBILITY INFORMATION ACQUISITION DEVICE AND VISIBILITY INFORMATION ACQUISITION DEVICE

CROSS-REFERENCE TO RELATED APPLICATIONS

This application is a U.S. National Phase of International Patent Application No. PCT/JP2022/012970, filed on Mar. 22, 2022, which published as WO 2023/053517 A1 on Apr. 6, 2023, and claims priority to JP 2021-161259, filed on Sep. 30, 2021, all of which are herein incorporated by reference in their entireties.

TECHNICAL FIELD

The present invention relates to a control method for a visibility information acquisition device and to a visibility information acquisition device.

BACKGROUND

For example, in JP 2017-138701 A, a virtual space image providing method of providing a head mounted display (HMD) with a virtual space image for a user to view is disclosed. According to the virtual space image providing method, the rotation direction and the rotation speed of the HMD are acquired, and a blurring process is applied to end regions on both sides of a virtual space image in a direction on a screen that corresponds to the rotation direction, in a range and at a strength depending on the rotation speed, thereby alleviating the Virtual Reality sickness (VR sickness).

SUMMARY

In vehicle development and the like, an object as an evaluation target is displayed on a virtual space image, and the visibility of the object in a real space is evaluated, in some cases. In such cases, the appearance of the object displayed on the virtual space image is required to be close to the appearance in the real space. For example, immediate after the viewpoint of a user is changed or immediate after the arrangement or distance of the object in the field of view is changed in the real space, the viewpoint and the peripheral region of the object appear blurry. A blurriness of the peripheral region in response to such movement of the viewpoint or the like changes over time depending on focal point adjustment characteristics of eyes, the state of the user, the conditions around the vehicle, etc. Accordingly, also in a case of displaying an object on a virtual space image and evaluating the visibility, it is desirable to reproduce the temporal change in blurriness in the real space as described above.

However, according to the prior art as described above, only the range and the strength of the blurring process applied to the virtual space image depending on the rotation speed of the HMD are set, without consideration in temporal change in the state of the blurring process applied to the set range. Typically, the blurring process for image data is executed at a speed in accordance with the performance of hardware that is responsible for image processing, and image data in a blurred state is generated at a desired strength and at a higher speed than the focal point adjustment speed of eyes. Consequently, according to the prior art, the temporal change in blurriness of the virtual space image displayed on the HMD when the HMD is rotated, i.e., when the orientation of the head of the user is changed and the viewpoint on the virtual space image is moved is different from that in the appearance of the real space. In order to make the visibility of the object displayed in the virtual space image close to that of the appearance of the real space, it is important to acquire information allowing temporal change in blurriness in the real space to be correctly understood, and to reflect the acquired information in the blurring process for the virtual space image.

An object of the present invention, which has been made with a focus on these points, is to provide a control method for a visibility information acquisition device, and a visibility information acquisition device that can acquire, with high accuracy, information required to allow generation of a virtual space image that achieves visibility close to that of the appearance of a real space during movement of the viewpoint.

To achieve the object, an aspect of the present invention provides a control method for a visibility information acquisition device displaying a first identifier at a first position ahead of a subject, displaying a second identifier at a second position spaced in a front-back direction from the first position, and acquiring visibility information on the second identifier when a viewpoint of the subject is moved from the first position to the second position. The control method includes: a first displaying step of displaying the first identifier at the first position so as to achieve a state in which a focus of the subject is on the first position: a second displaying step of displaying the second identifier at the second position, and moving the viewpoint of the subject from the first position to the second position: a control step of controlling a display state of the second identifier according to a preset transition condition, and causing a visibility of the second identifier to transition from a reference state to an intended state different from the reference state; and an acquisition step of acquiring, from the subject, the visibility information on the second identifier during transition of the visibility of the second identifier from the reference state to the intended state.

According to the control method for the visibility information acquisition device, information required to allow generation of a virtual space image that achieves visibility close to that of the appearance of a real space can be acquired with high accuracy when the viewpoint of the subject is moved.

DESCRIPTION

Hereinafter, an embodiment of the present invention is described in detail with reference to the accompanied drawings.

Figure 1:
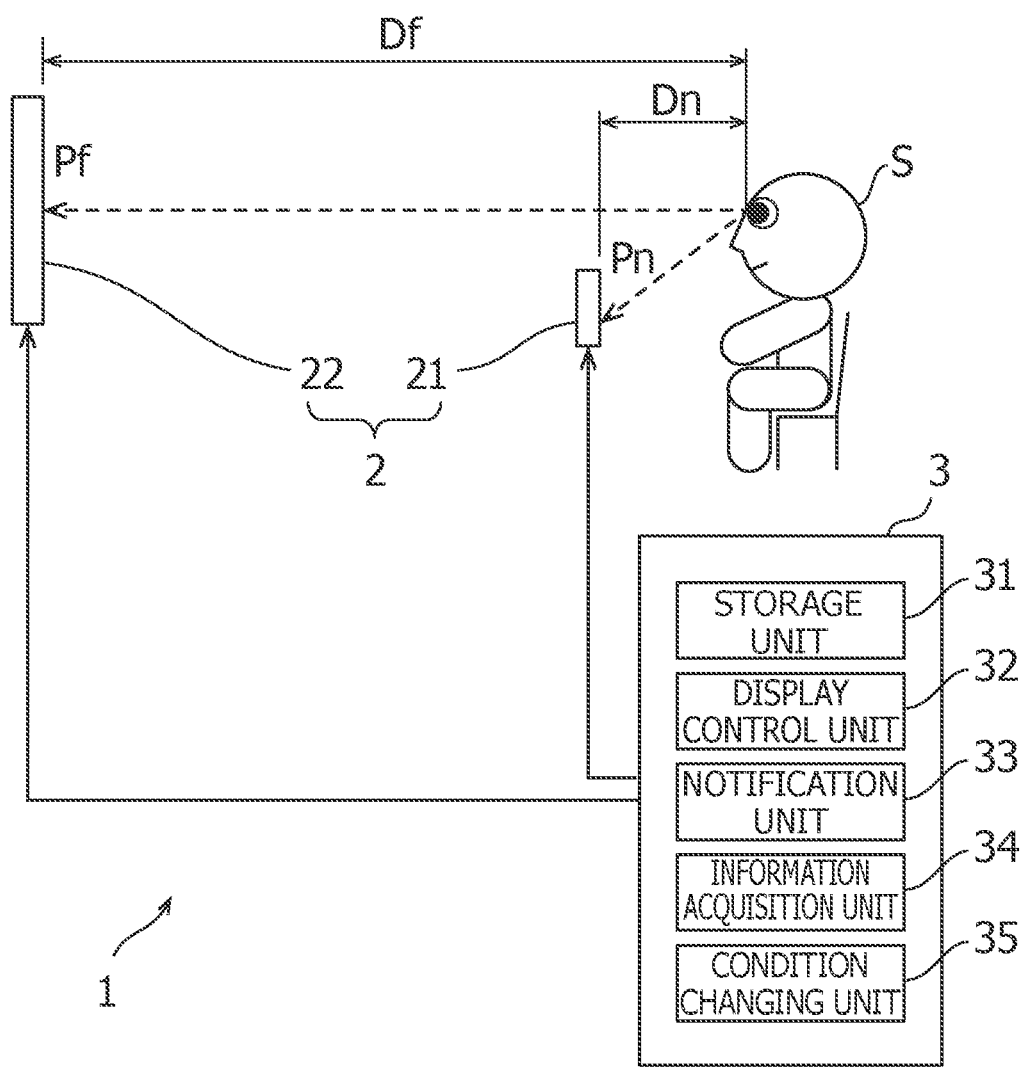
FIG. 1 is a conceptual diagram showing a configuration of a visibility information acquisition device according to one embodiment of the present invention.

FIG. 1 is a conceptual diagram showing a configuration of a visibility information acquisition device according to one embodiment of the present invention.

In FIG. 1, the visibility information acquisition device 1 in this embodiment includes, for example, a display unit 2, and an information processing unit 3. The display unit 2 can display a first identifier at a first position ahead of a subject S seated at a predetermined position, and display a second identifier at a second position spaced in the front-back direction from the first position. Each of the first position and the second position may not only be a position in a real space but also be a position in a virtual space. A display unit 11 according to this embodiment may be achieved, for example, by arranging two display devices in a real space, or achieved by setting two display regions in a virtual space using a head mounted display (HMD) or the like.

Figure 2:
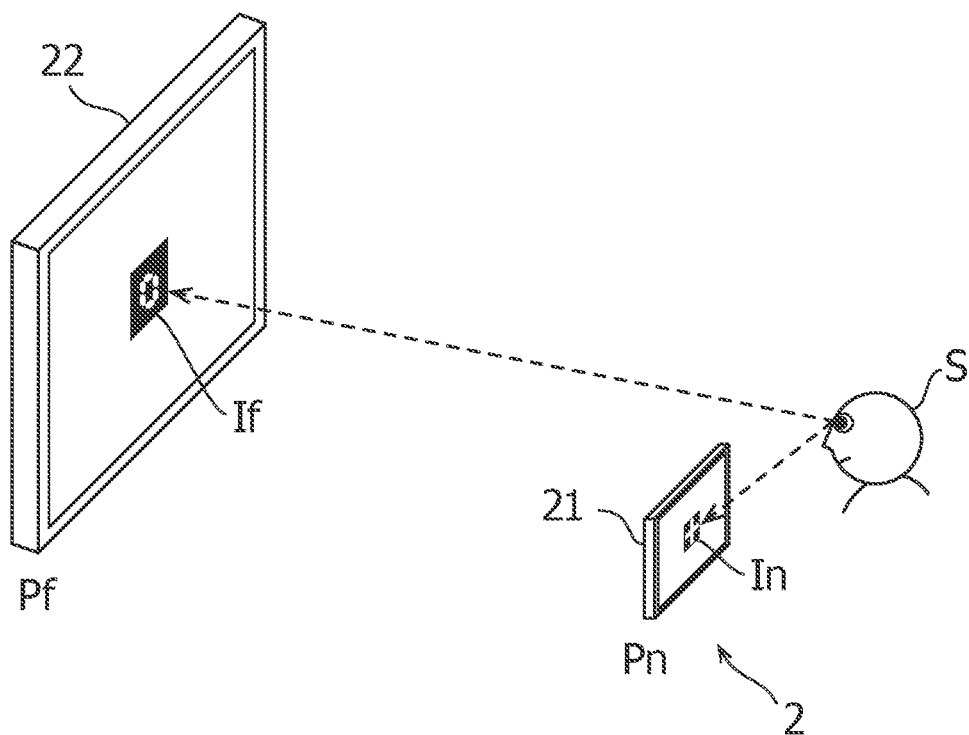
FIG. 2 is a conceptual diagram showing an example of a display unit achieved in a real space in the embodiment.

FIG. 2 is a conceptual diagram showing an example of the display unit 2 achieved in the real space.

In FIG. 2, the display unit 2 includes: a tablet terminal 21 disposed at a near position (hereinafter called "near position") Pn ahead of the subject S; and a display 22 disposed at a far position (hereinafter called "far position") Pf ahead of the subject S. The tablet terminal 21 and the display 22 are each disposed substantially in front of the subject S. The tablet terminal 21 is placed obliquely below the front of the subject S, with the screen facing the subject S. An identifier In is displayed in a region positioned substantially at a center of the screen of the tablet terminal 21. The display 22 is placed at a height that does not overlap the tablet terminal 21 in the field of view of the subject S. An identifier If is displayed in a region positioned substantially at a center of the screen of the display 22. In this embodiment, the distance Dn (FIG. 1) from the subject S to the tablet terminal 21 is set to, e.g., 0.2 m, and the distance Df (FIG. 1) from the subject S to the display 22 is set to, e.g., 5 m. Note that the arrangement of the tablet terminal 21 and the display 22 is not limited to the one example.

In a case in which the viewpoint of the subject S is moved from the tablet terminal 21 disposed at the near position Pn to the display 22 disposed at the far position Pf with respect to the display unit 2 (hereinafter called "viewpoint movement in the receding direction"), the near position Pn, the identifier In, and the tablet terminal 21 respectively correspond to the first position, the first identifier, and a first display device in the present invention, and the far position Pf, the identifier If, and the display 22 respectively correspond to the second position, the second identifier, and a second display device in the present invention. On the other hand, in a case in which the viewpoint of the subject S is moved from the display 22 disposed at the far position Pf to the tablet terminal 21 disposed at the near position Pn (hereinafter called "viewpoint movement in the approaching direction), the far position Pf, the identifier If, and the display 22 respectively correspond to the first position, the first identifier, and the first display device in the present invention, and the near position Pn, the identifier In, and the tablet terminal 21 respectively correspond to the second position, the second identifier, and the second display device in the present invention.

Figure 3:
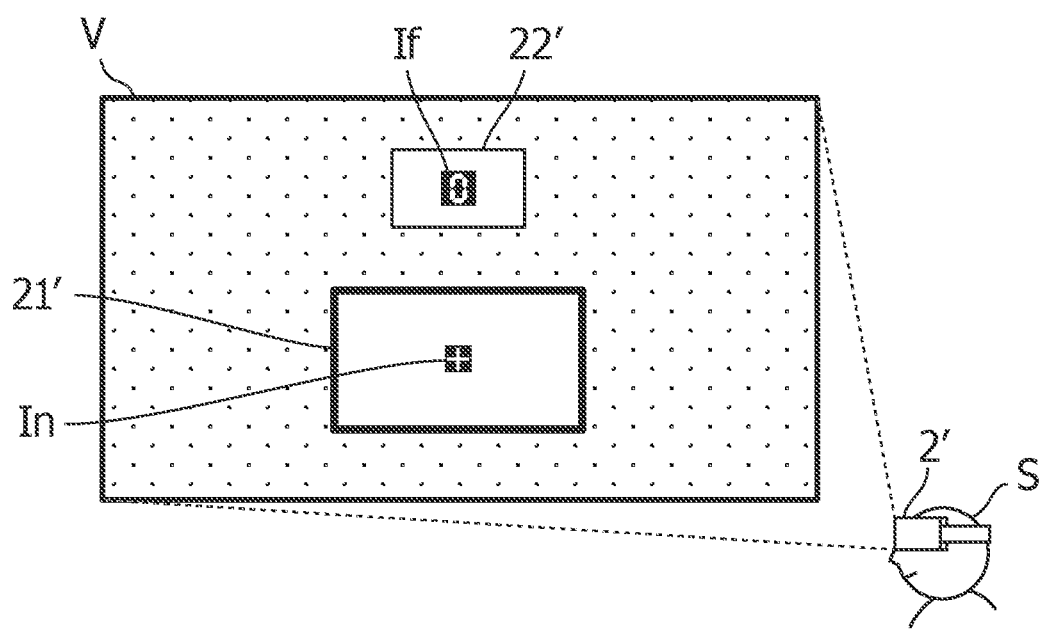
FIG. 3 is a conceptual diagram showing an example of a display unit achieved in a virtual space in the embodiment.

FIG. 3 is a conceptual diagram showing an example of the display unit 2' achieved in a virtual space.

In FIG. 3, the display unit 2' is achieved on a virtual space image VR displayed on an HMD worn on the head of the subject S. In the virtual space image VR, a first region 21' is formed below the center in the lateral direction, and a second region 22' is formed above the center in the lateral direction. The first region 21' and the second region 22' are set to be arranged spaced apart from each other in the depth direction (front-back direction viewed from the subject S) in the virtual space. The first region 21' is virtually achieved as the screen of the tablet terminal 21 in the real space shown in FIG. 2. The second region 22' is virtually achieved as the screen of the display 22 in the real space shown in FIG. 2. Consequently, in the virtual space image VR displayed on the HMD, information corresponding to the near position Pn (distance Dn from the subject S) is set as depth information on the first region 21', and information corresponding to the far position Pf (distance Df from the subject S) is set as depth information on the second region 22'. The identifier In is displayed substantially at the center of the first region 21', and the identifier If is displayed substantially at the center of the second region 22'.

Returning to FIG. 1, the information processing unit 3 includes, as its functional blocks, for example: a storage unit 31: a display control unit 32; a notification unit 33; an information acquisition unit 34; and a condition changing unit 35. Although not shown here, the hardware configuration of the information processing unit 3 has a configuration using, for example, a computer system that includes a processor, a memory, a user input interface, and a communication interface. That is, the information processing unit 3 achieves the function of each of the blocks by the processor of the computer system reading and executing programs stored in the memory.

The storage unit 31 stores a transition condition for causing the visibility of the second identifier (identifier In or If) displayed in a viewpoint peripheral region at the movement destination to transition from a reference state to an intended state different from the reference state when the viewpoint of the subject S is moved. A desired visibility level can be set as the reference state of the visibility, and the visibility level may be adjusted to be increased or reduced. In this embodiment, an example that the intended state of the visibility is set to be higher than the reference state is described. Note that setting of the reference state and the intended state of the visibility is not limited to the example. An intended state lower than the reference state can be set. The transition condition includes, for example, a display time period T during which the second identifier is continuously displayed, a delay time period L from completion of the movement of viewpoint of the subject S to start of state transition of the visibility of the second identifier, a transition time period α required for transition of the visibility of the second identifier from the reference state to the intended state, and a time constant τ determining temporal change in degree of increase when the visibility of the second identifier is increased. The storage unit 31 stores image data of the identifiers In and If to be displayed on the display unit 2. Furthermore, in the storage unit 31, visibility information on the second identifier acquired by the information acquisition unit 34, and the like are stored and accumulated. Note that the transition condition may be preliminarily stored in the storage unit 31. Alternatively, a transition condition received from an external device, not shown, may be temporarily stored in the storage unit 31, and be output to the display control unit 32. The transition condition, the image data of the identifiers In and If, and the visibility information on the second identifier are described in detail later.

The display control unit 32 causes the display unit 2 to display the first identifier and subsequently display the second identifier, and controls the display state of the second identifier according to the transition condition stored in the storage unit 31. Specifically, when the visibility information corresponding to the viewpoint movement in the receding direction is acquired, the display control unit 32 causes the tablet terminal 21 of the display unit 2 (or the first region 21' of the display unit 2') to display the identifier In, and subsequently causes the display 22 of the display unit 2 (or the second region 22' of the display unit 2') to display the identifier If, and controls the display state of the identifier If according to the transition condition. On the other hand, when the visibility information corresponding to the viewpoint movement in the approaching direction is acquired, the display control unit 32 causes the display 22 of the display unit 2 (or the second region 22' of the display unit 2') to display the identifier If, and subsequently causes the tablet terminal 21 of the display unit 2 (or the first region 21' of the display unit 2') to display the identifier In, and controls the display state of the identifier In according to the transition condition.

The state of the visibility of the second identifier can be controlled by, for example, applying a blurring process to the image to be displayed as the second identifier. The blurring process is a process of changing the amount of information on the image data, and achieving a state in which the image appears blurry. In other words, the blurring process is image processing of reducing the amount of information that can be identified through sight by the subject S. A specific example of the blurring process may be a process of reducing the amount of information, a process of reducing the resolution, or a process of gradually reducing the display area, a process of gradually increasing the display area, or a combination of these processes or the like with respect to the image to be displayed as the second identifier. According to an example of combination of the processes, an out-of-focus state can be easily reproduced by sequentially or alternatively performing the process of gradually increasing the display area, and the process of gradually reducing the display area. Consequently, the reference state of the visibility of the second identifier is, for example, a blurred state with out of focus after application of the blurring process, and represents a state in which the amount of information that can be identified about the image through sight by a user U is small. The intended state of the visibility of the second identifier is, for example, an in-focus state before application of the blurring process, and represents a state in which the amount of information that can be identified about the image through sight by the user U is large.

The notification unit 33 outputs, for example, an alert sound to prompt for movement of the viewpoint from the first position to the second position, to the subject S through a speaker or the like, not shown, provided for the display unit 2, 2' or the information processing unit 3. The notification unit 33 cooperates with the display control unit 32 and generates the alert sound. Specifically, a predetermined time period (e.g., two to five seconds) elapses after the first identifier is displayed on the display unit 2 by the display control unit 32, and then the alert sound is output from the notification unit 33. The timing when the alert sound is output from the notification unit 33 substantially coincides with the timing when the second identifier is displayed on the display unit 2, 2' by the display control unit 32. Note that means for notifying the subject S by the notification unit 33 is not limited to the alert sound. For example, characters and the like to prompt for movement of the viewpoint may be displayed on the image displayed on the display unit 2, 2', or a notification to prompt for movement of the viewpoint of the subject S may be performed by a call from an experiment manager. Only if notification content has been preliminarily issued to the subject S, a notification that includes no information to prompt for movement from the first position to the second position may be issued.

The information acquisition unit 34 acquires, from the subject S, the visibility information on the second identifier during transition of the visibility of the second identifier from the reference state to the intended state. The visibility information on the second identifier may be, for example, information indicating a result of evaluation by the subject S about the appearance of the second identifier with the visibility transitioning from the reference state to the intended state, or information indicating a result of detecting the position of the focus of the subject S during transition of the visibility of the second identifier by a sensor or the like, not shown. That is, information indicating an evaluation result of the appearance of the second identifier for the subject S is input into the information acquisition unit 34 through a user input interface, not shown, connected to the information processing unit 3, or an output signal of a sensor or the like that detects the position of the focus of the subject S is input into the information acquisition unit 34, and input information into the information acquisition unit 34 is acquired as visibility information on the second identifier. The visibility information acquired by the information acquisition unit 34 is stored in the storage unit 31 in association with a corresponding transition condition.

The condition changing unit 35 changes the transition condition stored in the storage unit 31, based on the visibility information on the second identifier acquired by the information acquisition unit 34. The transition condition changed by the condition changing unit 35 is used when the visibility information is acquired next and thereafter. Note that the condition changing unit 35 may be provided as required, and it may be omitted.

Next, the operation of the visibility information acquisition device 1 according to this embodiment is described. Here, the process of acquiring visibility information is described in detail using specific examples respectively with directions of movement of viewpoint of the subject S (the receding direction, and the approaching direction).

Figure 4:
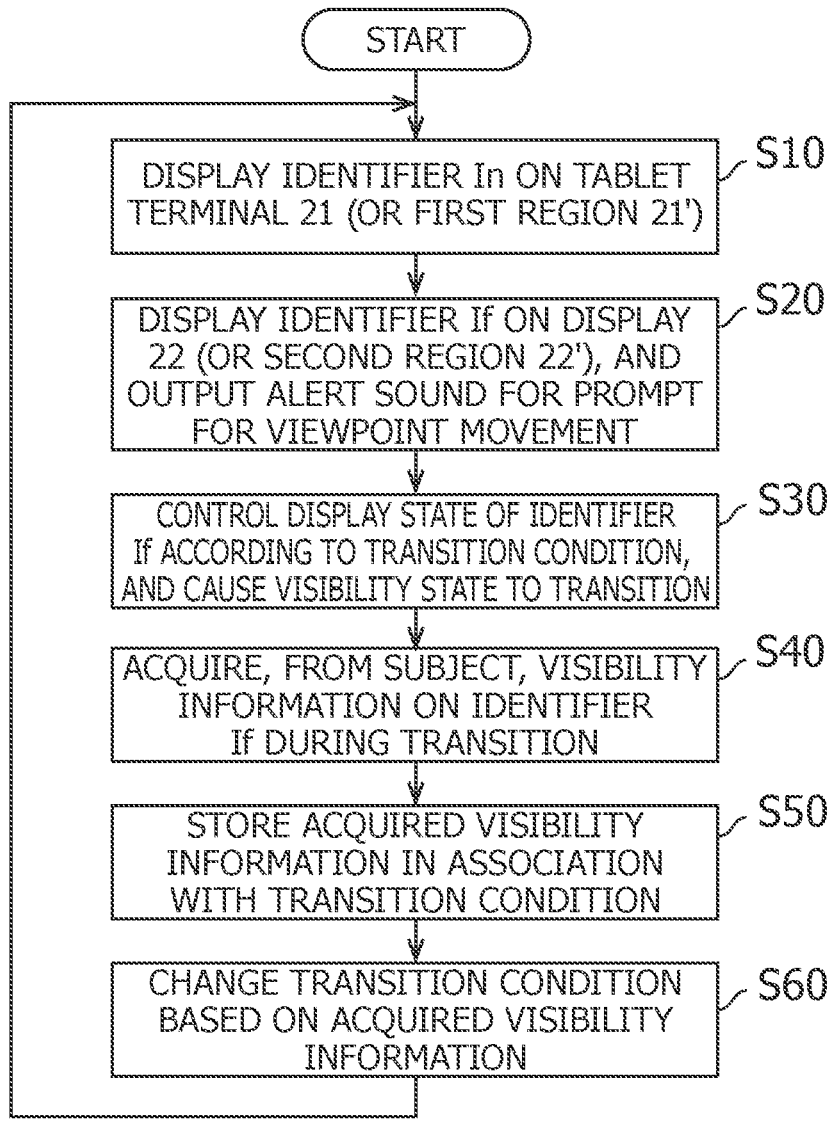
FIG. 4 is a flowchart showing an example of a process of acquiring visibility information in the case of movement in the direction in which the viewpoint recedes in the embodiment.
Figure 5:
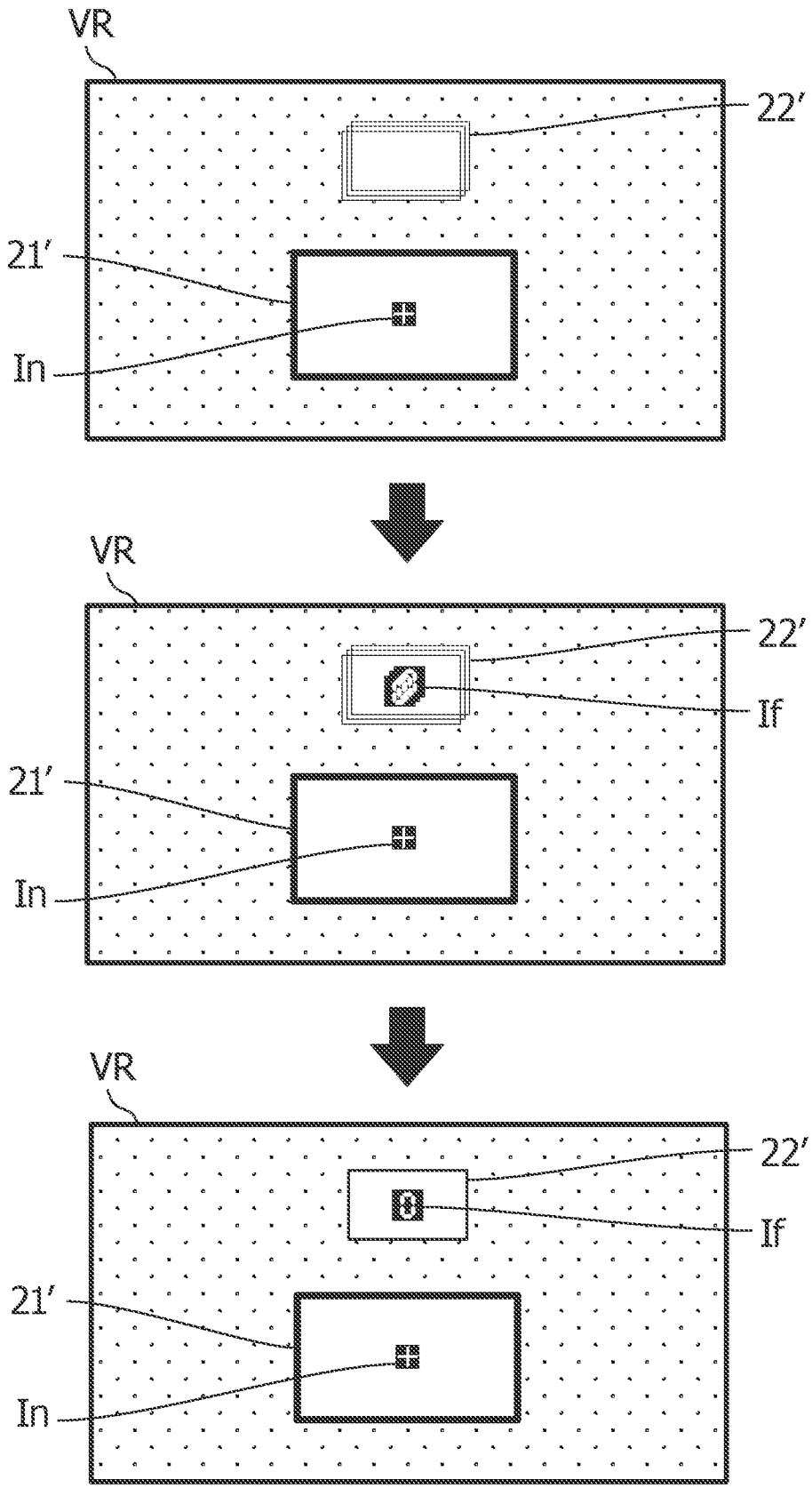
FIG. 5 is a diagram showing an example of identifiers displayed in a virtual space image in the case of movement in the direction in which the viewpoint recedes in the FIG. 6 is a graph showing an example of a temporal change in visibility of the second identifier of which the display state is controlled according to a transition condition in the embodiment.

FIG. 4 is a flowchart showing an example of the process of acquiring the visibility information in the case of movement in the direction in which the viewpoint recedes. FIG. 5 is a diagram showing an example of identifiers displayed on the display unit 2' (virtual space image VR) when the viewpoint moves in the receding direction.

In the case of the viewpoint movement in the receding direction, in the visibility information acquisition device 1 according to this embodiment, first, in step S10 of FIG. 4, the display control unit 32 displays the identifier In (first identifier) on the tablet terminal 21 of the display unit 2 or in the first region 21' in the virtual space image VR on the display unit 2'. Preferably, for example, a visual fixation indicator, such as a "+", facilitating fixation of the viewpoint of the subject S at the point is used as the identifier In displayed in this case. The upper part of FIG. 5 shows a state in which the identifier In is displayed in the first region 21' in the virtual space image VR using the visual fixation indicator "+" according to the process of step S10. Note that at the stage of step S10, the identifier If is not displayed on the display 22 of the display unit 2 or in the second region 22' in the virtual space image VR on the display unit 2'. Since the identifier In is displayed, the subject S watches the identifier In accordingly, and a state in which the focus of the subject S is placed on the near position Pn (first position) is formed.

In subsequent step S20, the display control unit 32 displays the identifier If (second identifier) on the display 22 of the display unit 2 or in the second region 22' in the virtual space image VR on the display unit 2', and the notification unit 33 outputs an alert sound for prompt for movement of the viewpoint of the subject S. Preferably, displaying of the identifier If and output of the alert sound in step S20 are performed when a waiting time period of about two to five seconds elapses after completion of the displaying of the identifier In in step S10. Providing such a standby time period ensures that the state in which the focus of the subject S is placed on the near position Pn can be formed.

Preferably, a random indicator is used as the identifier If displayed in step S20. The random indicator may be, for example, a numeral randomly selected from among a plurality of numerals, an image of a traffic sign, an icon, a character or the like. In this embodiment, a numeral (random indicator) randomly selected from among six numerals of 0 to 5 is used as the identifier If. The middle part of FIG. 5 shows a state in which the identifier If is displayed in the second region 22' in the virtual space image VR using a random indicator "0" according to the process of step S20. Note that displaying of the identifier If at this stage is in the reference state of the visibility of the identifier If, i.e., the blurred state that is out of focus after application of the blurring process. According to the process of step S20, the subject S moves the viewpoint from the near position Pn to the far position Pf in response to the alert sound, and visually identifies the identifier If using the random indicator displayed at the far position Pf.

In next step S30, the display control unit 32 controls the display state of the identifier If according to the transition condition stored in the storage unit 31, and causes the visibility of the identifier If to transition from the reference state to the intended state (in-focus state). The lower part of FIG. 5 shows the state in which the transition of the visibility is completed, and the identifier If in the intended state is displayed in the second region 22' in the virtual space image VR.

In step S40, the information acquisition unit 34 acquires, from the subject S, the visibility information on the identifier If during transition of the visibility of the identifier If from the reference state to the intended state. The acquisition of the visibility information on the identifier If by the information acquisition unit 34 is performed by inputting information indicating an evaluation result of appearance of the identifier If for the subject S into the information acquisition unit 34 through the user input interface, or by inputting, into the information acquisition unit 34, an output signal of a sensor or the like that detects the position of the focus of the subject S.

Specifically, the evaluation of the appearance of the identifier If by the subject S may be performed according to, for example, the following six-stage evaluation references.

6: Very legible
5: Legible
4: Legible without effort
3: Illegible to some extent but legible
2: Legible with effort
1: Illegible During transition of the visibility of the identifier If from the reference state to the intended state, the subject S evaluates which one of the six-stage evaluation references the appearance of the identifier If falls into, and inputs the evaluation result into the information acquisition unit 34. The input of the evaluation result into the information acquisition unit 34 may be at timing that is any of timing in transition of the visibility of the identifier If, timing at completion of the transition, and timing from completion of the transition to the end of displaying of the identifier If. Note that if the result of evaluation of the visibility of the identifier If in duration after start of transition at least to the completion is input into the information acquisition unit 34, more correct visibility information can be acquired by the information acquisition unit 34.

Here, the transition condition is specifically described. As described above, the transition condition includes, for example, a display time period T during which the second identifier is continuously displayed, a delay time period L from completion of the movement of viewpoint of the subject S to start of transition of the visibility of the second identifier, a transition time period $\alpha$ of transition of the visibility of the second identifier from the reference state to the intended state, and a time constant $\tau$ determining temporal change in degree of increase when the visibility of the second identifier is increased. As for the display time period T, for example, a time period selected from among four types that are 1.0, 0.5, 0.35, and 0.25 seconds can be set as one transition condition. The delay time period L, transition time period $\alpha$, and time constant $\tau$ can be appropriately set in consideration of conditions pertaining to the age, gender, eyesight, level of eye health, eye openness, dominant eye and the like of the subject S, and conditions pertaining to the environment of the real space or the virtual space.

Figure 6:
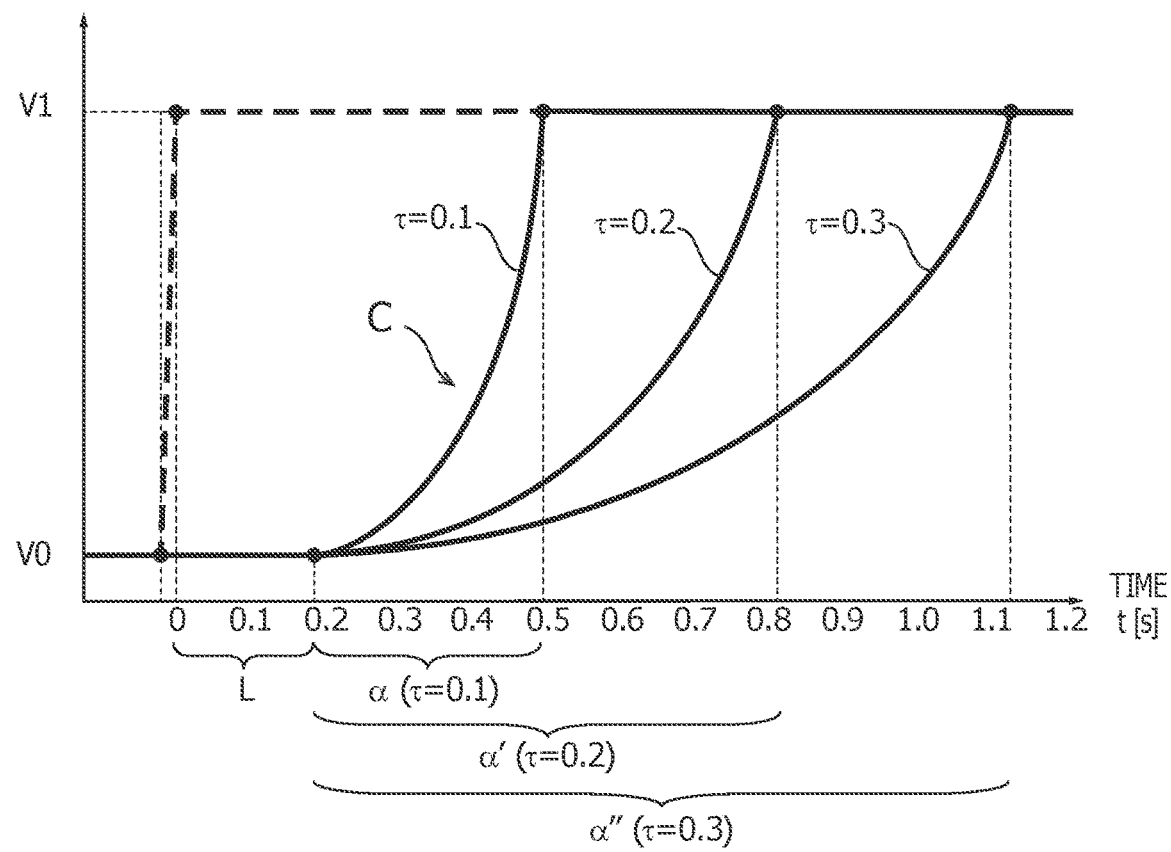

FIG. 6 is a graph showing an example of a temporal change in visibility of the second identifier (identifier If) of which the display state is controlled according to the transition condition during viewpoint movement in the receding direction. The ordinate axis of the graph of FIG. 6 indicates the state of the visibility V, and the abscissa axis indicates the time t. The state of the visibility V on the ordinate axis increases as distance from the intersection (origin) increases on the abscissa axis. The state with the visibility V=V0 corresponds to the reference state. The state of V=V1 corresponds to the intended state. Time t=0 indicates timing when the movement of viewpoint of the subject S is completed.

Solid lines in the graph of FIG. 6 represent the temporal change in visibility of the second identifier whose display state is controlled according to the transition condition. Here, an example of a case with the value of the time constant $\tau$, which is one of the transition conditions, being changed among three values of 0.1, 0.2, and 0.3 is shown in the graph of FIG. 6. As for the temporal change in visibility of the second identifier, in a time span from completion of the movement of viewpoint of the subject S until a lapse of the predetermined delay time period L (here, the delay time period L=0.2 sec.), the visibility is maintained to be in the reference state V0, and subsequently, the visibility starts to increase. After the time t=0.2 sec., the visibility of the second identifier gradually changes according to the elapse of time, and increases up to the intended state V1. The time period required until completion of transition to the intended state V1 after the elapse of the delay time period L is the transition time period α.

Each curve C over the transition time period α represents the temporal change in the visibility when the visibility of the second identifier is increased to the intended state V1. By making the shape of the curve C conform to, for example, a function represented by the following Expression (1), it is possible to be closer to the temporal change in focal length due to the focal point adjustment function of eyes of the subject S.

[Expression 1]

$$F = \{Do - (Do - Dt) * (1 - e^{-\frac{t}{\tau}})\}^{-1} \quad (1)$$

In the Expression (1), t represents the time [s] after start of transition. F represents the focal length [m] at the time t. Do represents the diopter that is the reciprocal of the focal length at the start of movement of viewpoint. Dt represents the diopter that is the reciprocal of the focal length at the end of movement of viewpoint. The e represents Napier's constant (base of natural logarithms). The τ represents the time constant. In the case of movement in the direction in which the viewpoint recedes as in FIG. 5, the distance Dn from the subject S to the near position Pn can be used as the focal length at the start of movement of viewpoint, and the distance Df from the subject S to the far position Pf can be used as the focal length at the end of movement of viewpoint. In this case, in the Expression (1), Do denotes 1/Dn, and Dt denotes 1/Df.

The focal length F in the Expression (1) corresponds to the state of the visibility V at the time t. The time constant τ is set in conformity with the transition condition, and the length of transition time period α (shape of curve C) is changed in accordance with the time constant τ. In the example in FIG. 6, the transition time period α' in the case of τ=0.2 is longer than the transition time period α in the case of the value of time constant τ is set to τ=0.1, and the transition time period α" in the case of τ=0.3 is much longer than the transition time period α'. As described above, the manner of temporal change in visibility of the second identifier is changed in accordance with the setting of the transition condition. Accordingly, by acquiring and comparing the visibility information on the second identifier with respect to each setting of the transition condition, the transition condition allowing the subject S to easily read the second identifier can be determined.

Note that broken lines in the graph in FIG. 6 represent the temporal change in visibility corresponding to the blurring process applied to the virtual space image in the prior art as described above. In the prior art, the blurring process applied to the virtual space image is executed at a speed in accordance with the performance of hardware that is responsible for image processing. Accordingly, the transition of the visibility from the reference state V0 to the intended state V1 is completed in a short period at the substantially same time as movement of the viewpoint.

Besides the display time period T, the delay time period L, the transition time period α, and the time constant τ described above, for example, a condition of whether acquisition of the visibility information is performed in the real space as shown in FIG. 2 or performed in the virtual space as shown in FIG. 3 may be set as the transition condition. Furthermore, in a case of performing acquisition of the visibility information in the virtual space, presence or absence of the blurring process, and presence or absence of the delay time period L may be set as one of the transition conditions. In consideration of the conditions, such as of the subject S and the environment, assumed as described above, various transition conditions are set, thus allowing highly accurate visibility information to be acquired.

Returning to FIG. 4, in step S50, the information acquisition unit 34 stores the acquired visibility information on the identifier If in the storage unit 31 in association with the corresponding transition condition. Accordingly, the information (visibility information) about the appearance of the identifier If in the case of transition of the state of the visibility of the identifier If according to the transition condition is accumulated in the storage unit 31.

In step S60, the condition changing unit 35 changes the transition condition stored in the storage unit 31, based on the visibility information on the identifier If acquired by the information acquisition unit 34. As for the change of the transition condition, for example, in a case in which the visibility information on the identifier If acquired by the information acquisition unit 34 falls into the evaluation reference of 2 described above, the display time period T, the delay time period L and the like set as the transition conditions are changed to different values, thus allowing improvement of visibility information to be acquired next and thereafter. When the process of changing the transition conditions by the condition changing unit 35, the processing returns to step S10, and the series of processes is repeatedly executed. Here, the example of changing the transition conditions based on the acquired visibility information is described. Alternatively, a plurality of transition conditions different from each other may be preliminarily stored in the storage unit 31, and the visibility information may be acquired with the plurality of transition conditions being sequentially switched.

Next, the operation of the visibility information acquisition device 1 in the viewpoint movement in the approaching direction is described.

Figure 7:
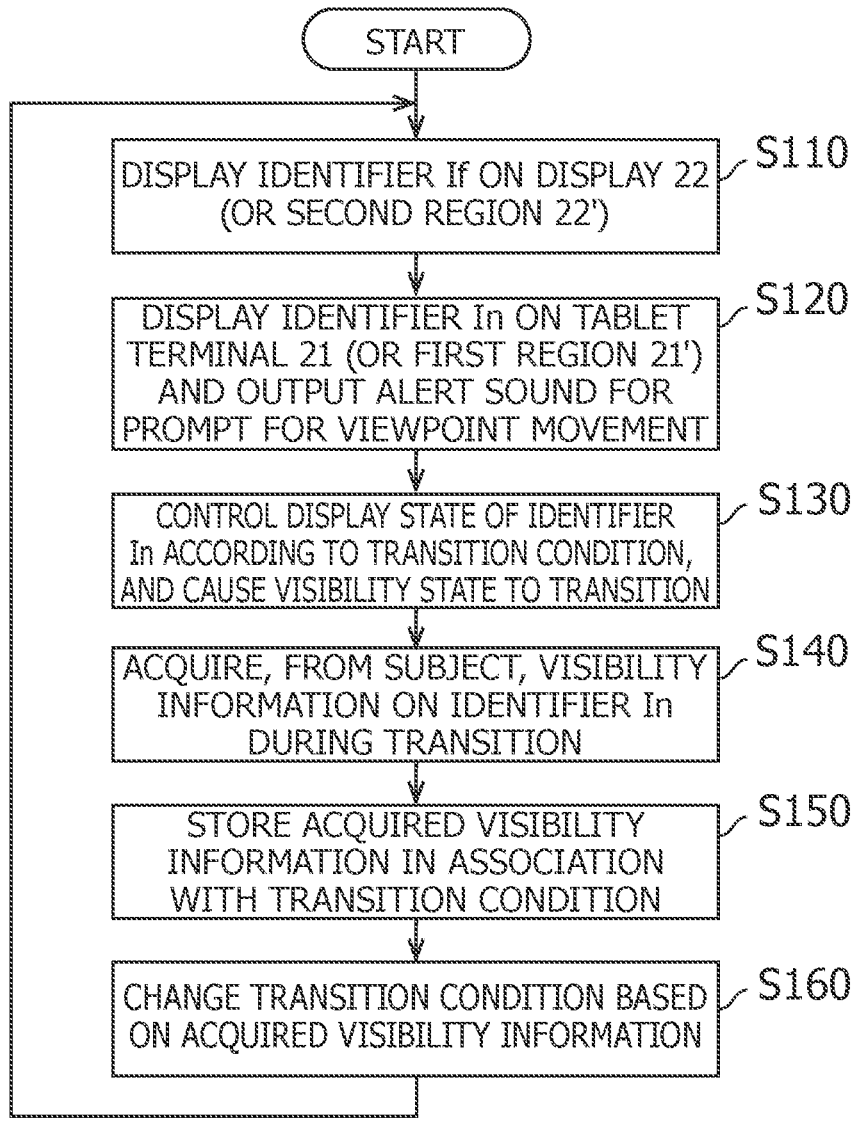
FIG. 7 is a flowchart showing an example of a process of acquiring visibility information when the viewpoint moves in an approaching direction in the embodiment.
Figure 8:
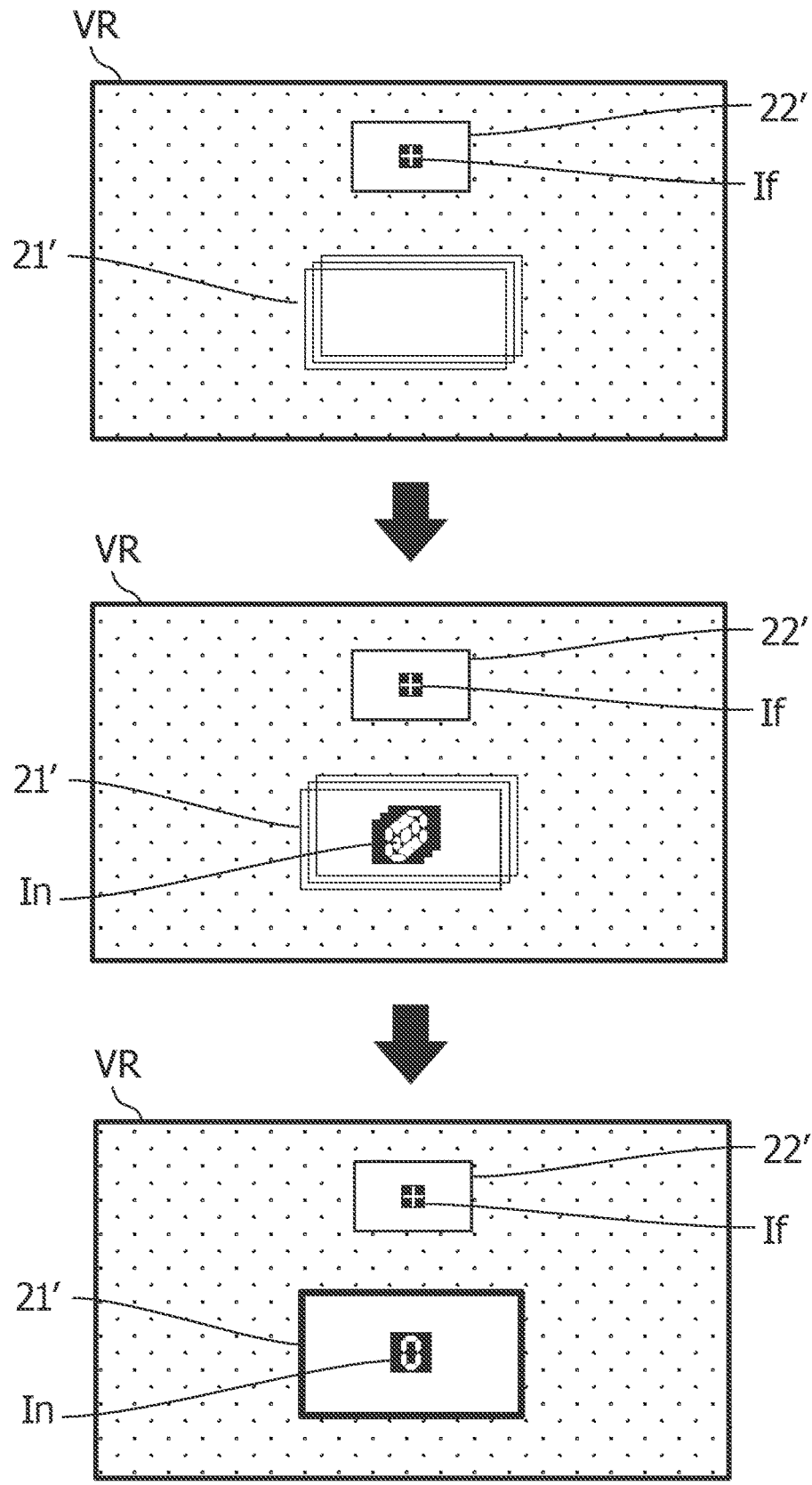
FIG. 8 is a diagram showing an example of identifiers displayed in a virtual space image when the viewpoint moves in the approaching direction in the embodiment.

FIG. 7 is a flowchart showing an example of the process of acquiring the visibility information when the viewpoint moves in the approaching direction. FIG. 8 is a diagram showing an example of identifiers displayed on the display unit 2' (virtual space image VR) when the viewpoint moves in the approaching direction.

In the case of the viewpoint movement in the approaching direction, in the visibility information acquisition device 1 according to this embodiment, first, in step S110 of FIG. 7, the display control unit 32 displays the identifier If (first identifier) using the visual fixation indicator "+", on the display terminal 22 of the display unit 2 or in the second region 22' in the virtual space image VR on the display unit 2'. The upper part of FIG. 8 shows a state in which the identifier If is displayed in the second region 22' in the virtual space image VR according to the process of step S110. Note that at the stage of step S110, the identifier In is not displayed on the tablet terminal 21 of the display unit 2 or in the first region 21' in the virtual space image VR on the display unit 2'. Since the identifier If is displayed, the subject S watches the identifier If accordingly, and a state in which the focus of the subject S is placed on the far position Pf (first position) is formed.

In subsequent step S120, the display control unit 32 displays the identifier In (second identifier) using a random indicator, on the tablet terminal 21 of the display unit 2 or in the first region 21' in the virtual space image VR on the display unit 2', and the notification unit 33 outputs an alert sound to prompt for movement of viewpoint of the subject S. Preferably, similar to the case of the viewpoint movement in the receding direction described above, displaying of the identifier In and output of the alert sound in step S120 are performed when a waiting time period of about two to five seconds elapses after completion of the displaying of the identifier In in step S10.

The middle part of FIG. 8 shows a state in which the identifier In is displayed in the first region 21' in the virtual space image VR using the random indicator "0" according to the process of step S120. Note that displaying of the identifier In at this stage is in the reference state of the visibility of the identifier In, i.e., the out-of-focus blurred state after application of the blurring process. According to the process of step S120, the subject S moves the viewpoint from the far position Pf to the near position Pn in response to the alert sound, and visually identifies the identifier In using the random indicator displayed at the near position Pn.

In next step S130, the display control unit 32 controls the display state of the identifier In according to the transition condition stored in the storage unit 31, and causes the visibility of the identifier In to transition from the reference state to the intended state (in-focus state). The lower part of FIG. 8 shows the state in which the transition of the visibility is completed, and the identifier In in the intended state is displayed in the first region 21' in the virtual space image VR.

In step S140, the information acquisition unit 34 acquires, from the subject S, the visibility information on the identifier In during transition of the visibility of the identifier In from the reference state to the intended state. The process of acquiring the visibility information on the identifier In by the information acquisition unit 34 is performed similar to the process of acquiring the visibility information on the identifier If in the viewpoint movement in the receding direction described above. In the case of viewpoint movement in the approaching direction, Do in the Expression (1) described above denotes 1/Df, and Dt denotes 1/Dn.

In step S150, the information acquisition unit 34 stores the acquired visibility information on the identifier In in the storage unit 31 in association with the corresponding transition condition. Accordingly, the information (visibility information) about the appearance of the identifier In in the case of transition of the state of the visibility of the identifier In according to the transition condition is accumulated in the storage unit 31.

In step S160, the condition changing unit 35 changes the transition condition stored in the storage unit 31, based on the visibility information on the identifier In acquired by the information acquisition unit 34. When the process of changing the transition conditions by the condition changing unit 35 is completed, the processing returns to step S110, and the series of processes is repeatedly executed.

Note that the series of processes (steps S10 to S60 of FIG. 4) in the viewpoint movement in the receding direction, and the series of processes (steps S110 to S160 of FIG. 7) in the viewpoint movement in the approaching direction described above may be alternatingly executed. Alternatively, a plurality of sets with different transition conditions may be executed according to a predetermined order, or randomly, repeatedly executed. For example, by alternatingly executing two sets with different transition conditions, the visibility information in a case in which the viewpoint moves from one set to the other set, and the visibility information in a case in which the viewpoint moves from the other set to the one set can be acquired, and a desired transition condition can be easily evaluated.

Figure 9:
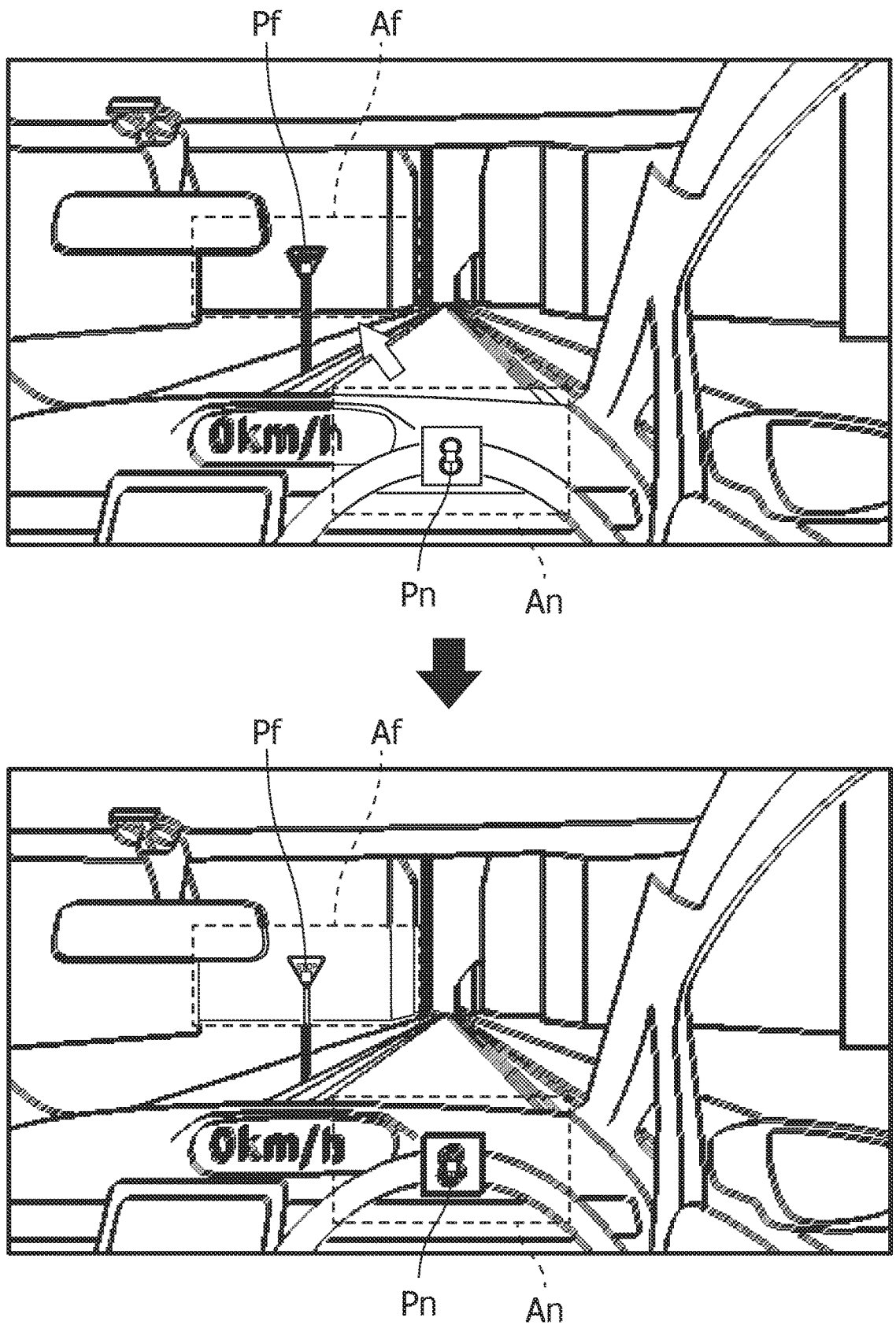
FIG. 9 is a diagram showing an example of determining the transition condition suitable for a drive simulator system, based on the visibility information acquired by the visibility information acquisition device in the embodiment, and executing display control for the virtual space image according to the transition condition.

The visibility information acquired by the visibility information acquisition device 1 in this embodiment as described above, and information about the transition condition associated therewith can be utilized for display control of the virtual space image executed when the viewpoint of the user is moved, in a drive simulator system used for visibility evaluation of various objects in development of a vehicle, such as an automobile, a vehicle drive simulation experience and the like. FIG. 9 shows an example of determining the transition condition suitable for the drive simulator system, based on the visibility information acquired by the visibility information acquisition device 1 in the embodiment, and executing display control for the virtual space image according to the transition condition.

The virtual space image shown in FIG. 9 is an image which is displayed on the HMD or the like worn by the user and in which a scene in the virtual space viewable by the user from a driver seat of a vehicle is represented. In the example shown, the virtual space image may include an upper part of a steering wheel, an upper part of dashboard, a right front pillar, a front end of a roof, a rearview mirror, and a right side mirror, as objects representing the vehicle. A numeral "8" displayed at the center of a lower part of the virtual space image is an object for evaluating the visibility around the upper end of the steering wheel. The virtual space image includes a road, a sidewalk, a building, and a traffic sign (stop sign), as objects representing stationary objects outside of the vehicle.

In the virtual space image shown in the upper part of FIG. 9, the viewpoint (symbol of □) of the user is at the near position Pn on the object of numeral "8" disposed around the upper end of the steering wheel, objects positioned in a viewpoint peripheral region An surrounded by broken lines in the diagram are in focus, and objects positioned outside of the viewpoint peripheral region An are out of focus and in a blurred state. A white arrow in the diagram indicates the movement direction of the viewpoint of the user. Here, the viewpoint of the user moves from the near position Pn to the far position Pf on an object of a traffic sign installed on a sidewalk on the left side in front of the vehicle. Note that the symbol indicating the viewpoint of the user is not displayed in the actual virtual space image.

When the viewpoint of the user moves from the near position Pn to the far position Pf, the display state of the object in the viewpoint peripheral region Af at the movement destination is controlled according to the transition condition determined based on the visibility information acquired by the visibility information acquisition device 1, and the state transitions from the state in which the visibility of the object is blurred (reference state) to the in-focus state (intended state). The virtual space image shown in the lower part of FIG. 9 indicates the state in which the transition of the visibility is completed. In contrast to the transition of the visibility of the object in the viewpoint peripheral region Af at the movement destination, in the example in FIG. 9, the display state of the object is controlled so that the visibility of the object in the viewpoint peripheral region An at the movement origin can transition from the in-focus state to the blurred state.

When the transition condition is determined based on the visibility information acquired by the visibility information acquisition device 1 in this embodiment, and the display control of the virtual space image in the drive simulator system is performed according to the transition condition as described above, the visibility in the real space about the object displayed in the virtual space image can be correctly evaluated in the vehicle development or the like. By performing a vehicle drive simulation experience using the drive simulator system, a more realistic drive experience can be provided for the user.

As described above, in the visibility information acquisition device 1 in this embodiment, a display control unit 32 displays a first identifier at a first position ahead of a subject S and subsequently displays a second identifier at a second position spaced in the front-back direction from the first position, and moves the viewpoint of the subject S from the first position to the second position. The display control unit 32 then controls the display state of the second identifier according to the transition condition, and causes the visibility of the second identifier to transition from the reference state to the intended state. The visibility information on the second identifier during transition is acquired by the information acquisition unit 34 from the subject S. Accordingly, information required to allow generation of the virtual space image that achieves visibility close to that of the appearance of a real space can be acquired at high accuracy when the viewpoint of the subject S (user) is moved.

In the visibility information acquisition device 1 in this embodiment, the series of processes from displaying of the first identifier to acquisition of the visibility information is regarded as one set, and a plurality of sets are repetitively executed according to the transition conditions different from each other. Accordingly, the visibility information that supports various transition conditions can be easily acquired.

In the visibility information acquisition device 1 in this embodiment, the display time period T of the second identifier is set to be one second or less. As to the focal point adjustment function of eyes, the time period required to place the focus on the movement destination when the viewpoint is moved is approximately one second or less. By setting the display time period T of the second identifier in consideration of the characteristics of the eyes, the series of processes for acquiring the visibility information on the second identifier can be effectively performed.

In the visibility information acquisition device 1 in this embodiment, the transition condition is changed based on the acquired visibility information. Accordingly, various transition conditions can be effectively set, which facilitates acquisition of a wide variety of visibility information.

In the visibility information acquisition device 1 in this embodiment, displaying of the first and second identifiers are respectively displayed on the first and second display devices (the tablet terminal 21 and the display 22), which negates the need to prepare a virtual space display device, such as an HMD, and can acquire the visibility information at low cost. Furthermore, providing the notification (output of the alert sound) for prompting the subject to move the viewpoint ensures that the movement of viewpoint of the subject S can be performed, and highly accurate visibility information can be acquired.

The embodiment of the present invention is thus described above. However, the present invention is not limited to the aforementioned embodiment, and can be variously modified and changed based on the technical concept of the present invention. For example, in the aforementioned embodiment, the example that the visibility of the second identifier is maintained in the reference state in the period from completion of the movement of viewpoint of the subject S to the elapse of the delay time period L. Alternatively, the display state of the second identifier may be controlled so as to slightly increase the visibility in the delay time period L.

In the aforementioned embodiment, the example in which the transition of the visibility of the second identifier from the reference state to the intended state is performed according to the function of Expression (1) is described. Alternatively, the state transition of the visibility of the second identifier may be performed according to any function, or a map that associates the state of visibility with the focal length.

In the case in which the state transition of the visibility of the second identifier conforms to the function represented by Expression (1), the example of using the reciprocals of the distances Dn and Df respectively as the diopters Do and Dt in the Expression (1) is described in the aforementioned embodiment. The reciprocal of the distance (focal length) from the subject S to the identifier In displayed at the near position Pn, and the reciprocal of the distance (focal length) from the subject S to the identifier If displayed at the far position Pf may be respectively used as the diopters Do and Dt. In addition, the degree of change in visibility of the second identifier can be changed in accordance with the difference between the focal length at the start of movement of viewpoint and the focal length at the end of movement of viewpoint.

Furthermore, in the aforementioned embodiment, an example is described in which the functions (blocks) of the storage unit 31, the display control unit 32, the notification unit 33, the information acquisition unit 34, and the condition changing unit 35 are achieved in the single information processing unit 3 (computer system). However, the object (control device) by which the functions are achieved may be a single object or a plurality of objects (control devices). The functions may be achieved in a plurality of information processing devices in a distributed manner.

The invention claimed is:

1. A control method for a visibility information acquisition device displaying a first identifier at a first position ahead of a subject and displaying a second identifier at a second position spaced in a front-back direction from the first position, the method comprising:
    a first displaying step of displaying the first identifier at the first position so as to achieve a state in which a focus of the subject is on the first position;
    a second displaying step of displaying the second identifier at the second position, and moving a viewpoint of the subject from the first position to the second position;
    a control step of controlling a display state of the second identifier displayed at the second position according to a preset transition condition, and causing a visibility of the second identifier to transition from a reference state to an intended state different from the reference state; and
    an acquisition step of acquiring, from the subject, the visibility information on the second identifier during transition of the visibility of the second identifier from the reference state to the intended state.

2. The control method for the visibility information acquisition device according to claim 1, wherein
the first displaying step, the second displaying step, the control step, and the acquisition step are regarded as one set, and a plurality of sets are repetitively executed, and
the plurality of sets have the transition conditions in the control steps, the transition conditions being different from each other.

3. The control method for the visibility information acquisition device according to claim 2, wherein in each of the plurality of steps, a display time period of the second identifier is set to be one second or less.

4. The control method for the visibility information acquisition device according to claim 2, further comprising a step of changing the transition condition to be used in the control step in a next set, based on the visibility information acquired in the acquisition step.

5. The control method for the visibility information acquisition device according to claim 1, wherein
the first displaying step displays the first identifier on a first display device disposed at the first position, and
the second displaying step displays the second identifier on a second display device disposed at the second position, and issues, to the subject, a notification for prompting movement of the viewpoint.

6. A control method for a visibility information acquisition device displaying a first identifier at a first position ahead of a subject and displaying a second identifier at a second position spaced in a front-back direction from the first position, the method comprising:
a first displaying step of displaying the first identifier at the first position so as to achieve a state in which a focus of the subject is on the first position;
a second displaying step of displaying the second identifier at the second position, and moving a viewpoint of the subject from the first position to the second position;
a control step of controlling a display state of the second identifier according to a preset transition condition, and causing a visibility of the second identifier to transition from a reference state to an intended state different from the reference state; and
an acquisition step of acquiring, from the subject, the visibility information on the second identifier during transition of the visibility of the second identifier from the reference state to the intended state,
wherein the second displaying step issues, to the subject, a notification for prompting movement of the viewpoint.

7. The control method for the visibility information acquisition device according to claim 6, wherein the second displaying step issues the notification when a predetermined waiting time period elapses after completion of the displaying of the first identifier in the first displaying step.

8. The control method for the visibility information acquisition device according to claim 1, wherein the second displaying step displays the second identifier using a random indicator.

9. A visibility information acquisition device comprising:
a display unit capable of displaying a first identifier at a first position ahead of a subject, and displaying a second identifier at a second position spaced in a front-back direction from the first position;
an information acquisition unit acquiring visibility information on the second identifier when a viewpoint of the subject is moved from the first position to the second position; and
a notification unit that prompts the subject to move the viewpoint,
wherein the information acquisition unit causes a visibility of the second identifier to transition from a reference state to an intended state different from the reference state according to a preset transition condition, and acquire, from the subject, the visibility information on the second identifier during the transition.

10. The visibility information acquisition device according to claim 9, wherein the transition condition can be changed.

11. The visibility information acquisition device according to claim 9, wherein the information acquisition unit starts transition of the visibility of the second identifier after notification by the notification unit.

* * * * *